US010048007B2

(12) United States Patent
Pena Astorga

(10) Patent No.: US 10,048,007 B2
(45) Date of Patent: Aug. 14, 2018

(54) THERMAL LANCE FOR FUSION CUTTING AND/OR PIERCING, COMPRISING AT LEAST FOUR TUBULAR PROFILES AND MORE THAN 17 CAVITIES INSIDE THE LANCE

(71) Applicant: TREFIMET S.A., Santiago (CL)

(72) Inventor: Victor Pena Astorga, Santago (CL)

(73) Assignee: TREFIMET S.A., Santiago (CL)

( * ) Notice: Subject to any disclaimer, the term of this patent is extended or adjusted under 35 U.S.C. 154(b) by 0 days.

(21) Appl. No.: 15/109,310

(22) PCT Filed: Dec. 19, 2014

(86) PCT No.: PCT/CL2014/000082
§ 371 (c)(1),
(2) Date: Jun. 30, 2016

(87) PCT Pub. No.: WO2015/103715
PCT Pub. Date: Jul. 16, 2015

(65) Prior Publication Data

US 2016/0341478 A1 Nov. 24, 2016

(30) Foreign Application Priority Data

Jan. 7, 2014 (CL) .................................... 34-2014

(51) Int. Cl.
*B23K 7/00* (2006.01)
*F27D 3/15* (2006.01)
*E21B 7/14* (2006.01)

(52) U.S. Cl.
CPC ............ *F27D 3/1527* (2013.01); *E21B 7/146* (2013.01)

(58) Field of Classification Search
CPC .................................................. F27D 3/1527
(Continued)

(56) References Cited

U.S. PATENT DOCUMENTS 3,602,620 A * 8/1971 Fassler .................... E21B 7/146 175/11
4,401,040 A 8/1983 Dobi
(Continued)

FOREIGN PATENT DOCUMENTS

CH 617613 A5 6/1980
CL 20050000142 10/2006
(Continued)

OTHER PUBLICATIONS

International Searching Authority, Written Opinion of the International Searching Authority, dated May 26, 2015 (pp. 1-7).
PCT Exam Report Translation, (pp. 1-3), 2016.

*Primary Examiner* — Scott R Kastler
(74) *Attorney, Agent, or Firm* — Gottlieb, Rackman & Reisman, P.C.

(57) ABSTRACT

The invention relates to a thermal lance (1) having adequate flexibility and concentrated effective heating capacity for the fusion cutting and/or piercing of any type of material, for example, for piercing and opening tapping passages in melting furnaces that use plugs made of clay or mixtures of, inter alia, alumina, silica and carbon. The thermal lance comprises at least four tubular profiles, one disposed externally and three disposed internally, and more than seventeen cavities housed inside said lance, wherein at least two of said four tubular profiles have different cross-sections, wherein each tubular profile is disposed in a contiguous manner in relation to the other tubular profiles, and wherein each tubular profile is selected from tubular profiles having a circular, square, triangular, hexagonal, oval, or multi-point star-shaped cross-section. The invention also relates to the use of the thermal lance for the fusion cutting and/or piercing of any type of material.

20 Claims, 4 Drawing Sheets

(58) Field of Classification Search
USPC ............................................................ 266/48
See application file for complete search history.

(56) References Cited

U.S. PATENT DOCUMENTS

| | | | | |
|---|---|---|---|---|
| 5,000,426 | A | 3/1991 | Campana et al. | |
| 7,273,237 | B1 | 9/2007 | Plattner | |
| 7,749,427 | B2 | 7/2010 | Campana, Jr. | |
| 9,452,487 | B1 * | 9/2016 | McComb ................. | B23K 7/00 |
| 2016/0341478 | A1 * | 11/2016 | Pena Astorga ........ | F27D 3/1527 |

FOREIGN PATENT DOCUMENTS

| | | | |
|---|---|---|---|
| GB | 1273504 | A | 5/1972 |
| GB | 1288931 | | 9/1972 |
| GB | 1317540 | | 5/1973 |
| GB | 2151530 | A | 7/1985 |
| WO | 2013/097045 | A1 | 7/2013 |

* cited by examiner

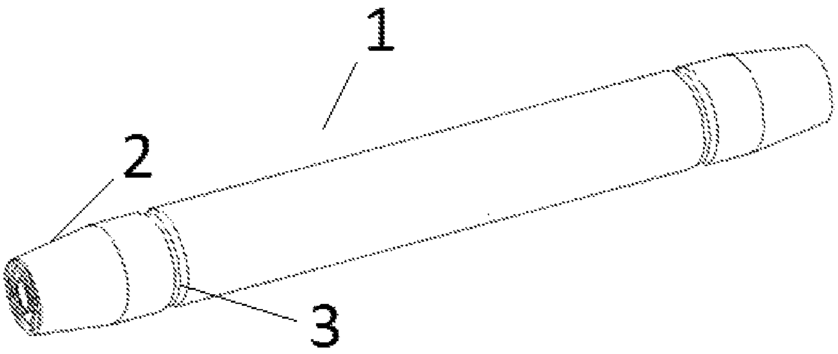
Figure 1-A
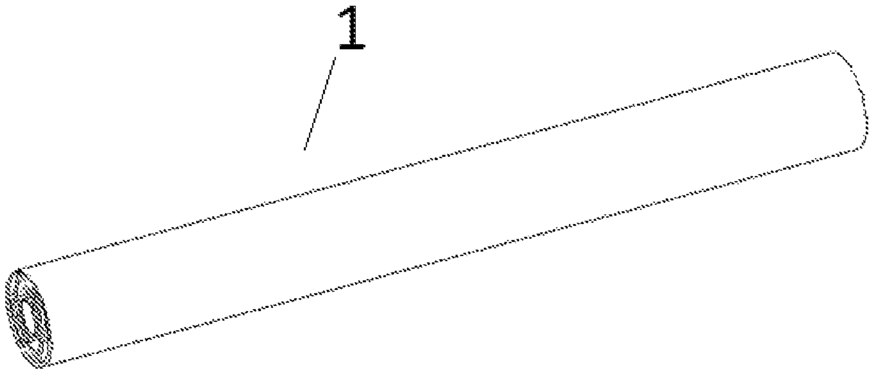
Figure 1-B

THERMAL LANCE FOR FUSION CUTTING AND/OR PIERCING, COMPRISING AT LEAST FOUR TUBULAR PROFILES AND MORE THAN 17 CAVITIES INSIDE THE LANCE

FIELD OF THE INVENTION

The invention relates to consumable devices that can be consumed by exothermic reaction which are used for piercing and opening tapping passages in melting furnaces that use plugs made of clay or mixtures of, inter alia, alumina, silica and carbon, used in the smelting of ores such as, inter alia, copper, steel, and ferroalloys, by means of applying mixtures of oxidizing gases or pressurized oxygen. In general, the consumable devices of the present invention are suitable for the fusion cutting and/or piercing of any type of material, in any thickness and dimension.

More specifically, the invention relates to thermal lances, also referred to as oxygen lances that allow the circulation of oxidizing gases, such as pressurized oxygen, from one end of the thermal lance to the other, which work both as a burner and as a combustible element.

BACKGROUND OF THE INVENTION

A thermal lance generally corresponds to a long, narrow tube with an oxidizable outer body and comprising along the entire extension thereof one or more oxidizable inner components, such as solid wires. The inner bodies are distributed inside the outer body, with gaps therebetween. In general, a thermal lance measures from 8 to 50 mm in diameter and from 1 to 12 m in length.

At their ignition end, thermal lances reach temperatures in the order of 3,500° C. to 5,530° C., and thermal lance consumption times are in the order of 0.2 to 5 meters per minute, when the pressure of the oxidizing gas is comprised from 392.3 kPa to 980.7 kPa. However, the energy that a lance can usually generate is lost in melting the lance itself, for example the heat of combustion of iron is of 4.23 KJ/g and when burning a standard thermal lance, generally containing three grams of iron, one gram burns quickly while the other two grams melt without combusting, which ultimately translates into part of the energy generated by the gram that did combust is lost in melting the other two grams that did not combust. Since the energy is spent in the lance itself, there is much less energy available for the work at hand.

Invention patent registration no. 44,086 discloses a device for piercing and opening passages in clay in melting furnaces, used in the smelting of ores, formed by an hollow outer tubular body, having in its inner area a symmetrical longitudinal body having a smaller length and made of steel, with a central opening and at least four preferably convex vertexes, the outer walls of which are concave and straight, the inner walls of which are convex and straight; furthermore, said vertexes are joined with the inner wall of the tubular body, at least four cavities being formed which allow the entry and exit of oxygen delivered through the cylinder.

Patent document GB1288931 discloses a thermal lance having a metallic tubular body comprising a plurality of cylindrical wires therein, which are welded to the adjacent edges and take up all the inner space of the tube, only some passages remaining for circulation of the oxidizing gas.

In turn, patent document GB2151530 relates to a thermal lance comprising an outer metal conduit being made of aluminum or iron or an alloy containing predominantly iron, a inner metal conduit and/or a number of metal rods located within the outer metal conduit, the inner metal conduit and/or metal rods being made of aluminum or iron or an alloy containing predominantly steel, such that at least one of the conduits or one of the rods is made of aluminum and at least one of the conduits or one of the rods is made of iron or an alloy containing predominantly steel; the lance including a holder at one end, which is provided with a valve through which, in use, the oxygen may be admitted to pass through the lance to the other end for the ignition.

U.S. Pat. No. 4,401,040 discloses a thermal torch comprising: an elongate burner pipe having a longitudinal axis and open at both ends; a bundle of elongate consumable rods arranged within the interior of said burner pipe, said rods having longitudinal axes parallel to and coextensive with said burner pipe and said rods having substantially identical cross-sectional configurations, said rods arranged to form at least a first and a second pressure fuel passage, the first passage extending between the inner surface of said burner pipe and the outer surfaces of the ones of said rods which are arranged adjacent the inner surface of said burner pipe, and the second passage extending between the inner surfaces of the ones of said rods which are arranged adjacent the inner surface of said burner pipe and the outer surfaces of the remainder of said rods.

Patent document CH617613 relates to an oxygen lance having a hollow tubular shell internally comprising particles that can be melted and have irregular and regular shapes, the particles being fixed with adhesive and the core of the lance is permeable to oxygen.

Patent document GB1317540 discloses a thermal lance comprising a plurality of cylindrical metal wires enclosed in a hollow tubular body, the cross-section of the tubular body being reduced to firmly locate the metal wires therein.

As can be seen, in the state of the art, there are different types of thermal lances. However, there is still a need to provide more efficient thermal lances both in terms of the effective heating capacity they develop and in terms of the flexibility capacity, as required, from the most rigid to the most flexible. Furthermore, there is a need to provide lances that allow a higher concentration of the energy generated, in which the oxidizing gas or oxygen stream can be managed at will and integral use of the lance is achieved.

Based on the foregoing, an objective of the present invention is to develop a thermal lance that increases the effective heating capacity developed by the lance and that concentrates the energy so as to be able to control the work thereof.

At the same time, another objective of the present invention is to develop a lance that can be operated using different oxygen streams, keeping the combustion thereof level and constant, as needed at the time of the operation thereof.

Another objective of the present invention is to develop a thermal lance having greater flexibility, for example, being able to bend.

Yet another objective of the present invention is to develop a thermal lance that does not need external elements for the fixing and securing of its parts, i.e., having only integral fixing elements without having to use welds, screws, wedges, or external pressing, making the inner elements narrower.

Furthermore, another objective of the present invention is to develop a lance that does not melt at high temperatures above 1,400° C., such that it continues combusting above those temperatures.

Likewise, another objective of the present invention is to provide a thermal lance that is readily susceptible to coupling to another thermal lance, for the purpose of preventing losses of lance remnants at the time the lances are being used.

SUMMARY OF THE INVENTION

The present invention relates to a thermal lance for piercing and opening tapping passages in melting furnaces that use plugs made of clay or mixtures of, inter alia, alumina, silica and carbon, comprising at least four tubular profiles and more than seventeen cavities housed inside the lance, and where the tubular profiles are selected from tubular profiles having a circular, square, triangular, hexagonal, oval, or multi-point star-shaped cross-section.

BRIEF DESCRIPTION OF THE DRAWINGS

The invention will be described below in reference to the attached drawings in which:

FIGS. 1-A and 1-B each depict a view of a type of thermal lance like the one of the present invention.

DETAILED DESCRIPTION OF THE INVENTION

Figure 2:
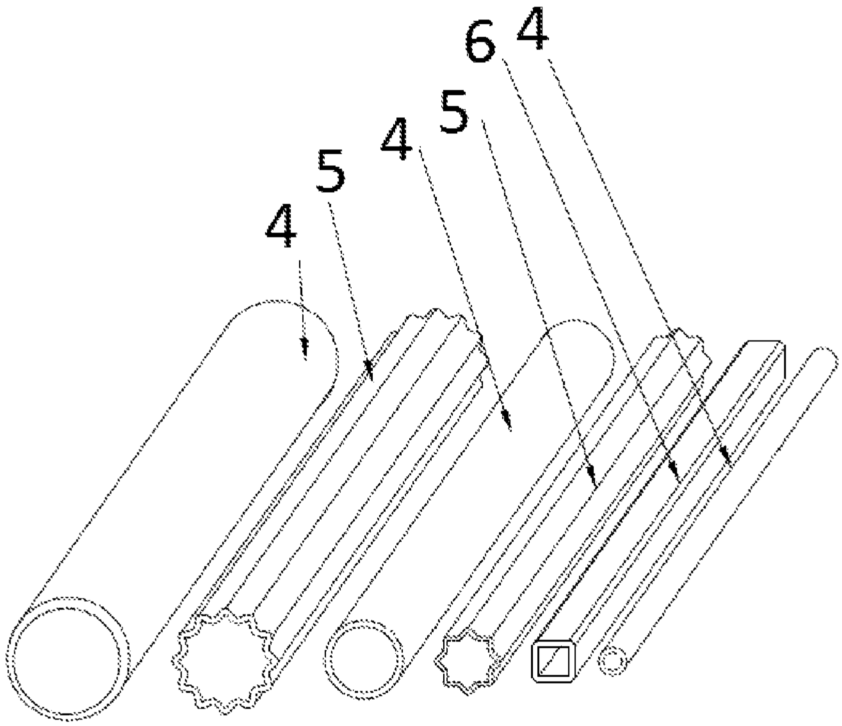
FIG. 2 depicts a view of some of the different types of profiles forming part of the thermal lance of the present invention.

The present invention describes a thermal lance (1) for the fusion cutting and/or piercing of any type of material, for example, for piercing and opening tapping passages in melting furnaces that use plugs made of clay or mixtures of, inter alia, alumina, silica and carbon, comprising at least four tubular profiles, one arranged externally and three arranged internally, and more than seventeen cavities housed inside the lance, where two of the at least four tubular profiles have different cross-sections, wherein each tubular profile is arranged in a contiguous manner in relation to the other tubular profiles, and where each tubular profile is selected from tubular profiles having a circular (4), square (6), triangular (not shown), hexagonal (not shown), oval (not shown), or multi-point star-shaped (5) cross-section.

One of the at least four tubular profiles forming the thermal lance corresponds to an outer tubular profile and the others correspond to the inner tubular profiles, such that the outer tubular profile is responsible for housing the inner profiles and the cavities that are formed between contiguous profiles.

In one embodiment of the present invention, the inner profiles are located next to one another, covering the entire inner perimeter of the outer tubular profile.

In another embodiment of the present invention, the inner profiles are located concentrically in relation to one another and in relation to the outer tubular profile. In this concentric embodiment, each tubular profile forming the lance has a cross-section different from the cross-section of the contiguous profile.

The cavities housed inside the outer tubular profile correspond to the sum of the cavities of the tubular profiles plus the cavities that are formed between contiguous profiles. All the inner cavities formed inside the lance have varied geometric shapes. The shape of each cavity and the amount of cavities between profiles depends on the shape of the cross-sections of the contiguous profiles. In general, a lance having four or more concentric profiles having multiple vertexes generates from 17 to 100 or more inner cavities. The inner cavities allow the free circulation of oxidizing gases, which are necessary when the thermal lance is in the operating state, the oxidizing gases preferably corresponding to an oxygen stream. The inner cavities allow the oxidizing gas stream to pass through the lance during the operation thereof with a suitable turbulence, and the ratio of the dimensions of these cavities in reference to the wall thicknesses of the tubular profiles is one that achieves the desired lance efficiency.

The shape, size and number of inner cavities allow the lance to have concentrated effective heating capacity in the center of the lance, whereby generating greater amount of effective heating energy in one and the same cross-section, doubling its efficiency, being able to cut or pierce 100% more with the same grams of lance in relation to current lances, which at the same time entails a reduction of the cutting or piercing time by at least 50%. Furthermore, the lance can be operated using different oxidizing gas streams, keeping the combustion thereof level and constant, and can even be operated with less pure oxygen (90%) and with different oxygen streams (high and low). Unlike current lances in which combustion is not concentrated, but rather randomly occurs at different points of the cross-section, even burning at different points longitudinally, and where furthermore current lances considerably reduce their efficiency, even going out when oxygen with a purity of less than 95% is circulated and when excess oxygen streams are circulated.

Additionally, the lances of the present invention reduce the emission of polluting gases since they achieve efficient combustion due to the cavities formed, which allow reaching a balance in the contact between the iron and the oxygen stream, and at the same time reducing operating costs because less time and a smaller oxygen stream are required for the cutting or piercing.

The thickness of each tubular profile is comprised in a range from less than 0.9 mm to more than 3.0 mm. In one embodiment, the thermal lances of the present invention can be made of low-carbon steel.

In the thermal lances of the present invention, the outer tubular profile forms the casing of the lance and said casing has a uniform or irregular outer structure. The outer body of the lance can have the same cross-section along the entire body thereof or can have more than one cross-section. Likewise, the inner profiles can have the same cross-section along the entire body thereof or can have more than one cross-section. The thermal lances of the present invention can be susceptible to coupling (FIG. 1-A) or not susceptible to coupling (FIG. 1-B), depending on the shape of their outer ends. A lance susceptible to coupling is one that can be attached to another lance, either directly without the intervention of external means, or through additional means, for example a coupling device or part which allows attaching both lances.

FIG. 1-A shows a type of thermal lance (1) susceptible to coupling, in which the ends of the casing of the lance have been modified such that said ends have an inverted conical shape (2). Furthermore, at each end of the uniform casing, immediately before the inverted conical ends, such lances have a smooth and cylindrical surface and an annular external groove (3). The casing of such lances, as in lances not susceptible to coupling, can have different cross-sections, and the cross-section thereof depends on the cross-section of the outer profile. In one embodiment of such lances, the uniform casing is cylindrical and straight. The outer shape of the ends of such thermal lances of the present invention, allows the easy assembly between one lance and another through a hollow, outer coupling part or device that allows holding a lance at each of its ends. The inverted conical ends of such lances allow facilitating the fitting with the coupling part, and the annular external groove (3) of the lance allows assuring the fitting between the lance and the coupling part. This type of lance corresponds to a lance susceptible to coupling at both its ends. The size of such lances is variable and depends on the application given to the lance, and the location of the outer groove at each end of the lance allows the lances to not interfere with one another when they are coupled together.

In another embodiment, the thermal lances of the present invention that are susceptible to coupling have only one end with an inverted conical shape, which indicates that they can be coupled at only one end. Additionally, at said end of the casing, immediately before the inverted conical end, such lances have a smooth and cylindrical surface and an annular external groove.

Being able to provide lances coupled to each other allows complete consumption of each lance at the time of being used, such that there are no lance remnants and therefore no losses of material, making the operation more cost-effective. The shape of the ends of the lances and of the coupling parts allows attaching as many lances as required for the purpose of preventing losses of lances.

In general, the lances can have lengths comprised in the range from less than 1 m to more than 10 m.

In another embodiment, the thermal lances of the present invention have a coating made from a material having a high melting point (above 2,000° C.), such as a ceramic material, which is applied to lances working in sites with temperatures exceeding 1,400° C., thereby preventing the lances from melting and accordingly losing their shape, their capacity for conducting oxidizing gases and their combustion capacity. The coating of the lances can be applied to the outer profile and/or to at least one of the inner profiles.

The thermal lance of the present invention is obtained by means of applying thermal, mechanical and chemical processes. Each tubular profile before being concentrically fitted is subjected to a metal shaping process, the outer tubular profile preferably being the first to be shaped, and the central inner tubular profile being the last one to be shaped. The amount of tubular profiles to be subjected to the shaping process depends on the design of each lance, i.e., on the amount of profiles required for a specific design of the lance. Additionally, the selection of the amount of tubular profiles that will form a lance depends on the use that will be given to the lance, in general being able to have lances that are 2 mm in diameter up to lances that are 100 mm in diameter.

Once the shaping process of each tubular profile has ended, forming part of the lance, the shaped profiles are gradually attached to one another by means of thermal, mechanical and chemical processes which, in addition to carrying out the assembly, achieve an interference of measurements between profiles, such that a specific profile is fixed (attached) to the profile right before it, which allows leaving them fixed and secured for withstanding the pressure and the oxidizing gas or oxygen streams passing through the lance during the operation thereof, without one profile becoming detached from another.

FIG. 2 shows different types of profiles both in terms of the shape of the cross-section and in terms of the inner diameter of each profile.

Figure 3:
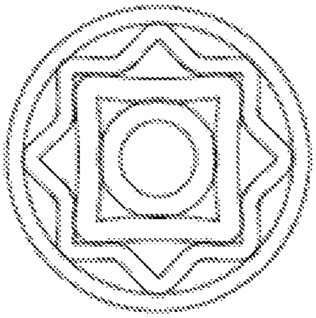
FIGS. 3 and 4 depict two embodiments of the lance of the present invention formed from four tubular profiles.

FIG. 3 shows an embodiment of the present invention formed by four tubular concentric profiles with seventeen inner cavities.

Figure 4:
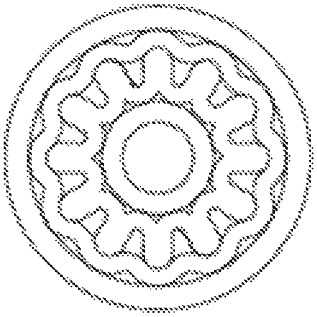

FIG. 4 shows an embodiment of the present invention formed by four tubular concentric profiles with thirty-seven inner cavities.

Figure 5:
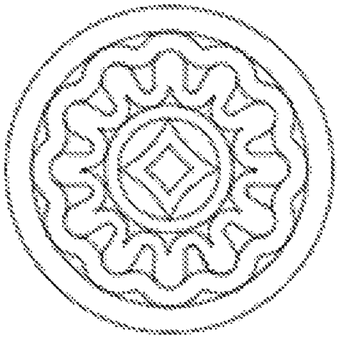
FIG. 5 depicts an embodiment of the lance of the present invention formed from five tubular profiles.

FIG. 5 shows an embodiment of the present invention formed by five tubular concentric profiles with forty-one inner cavities.

Figure 6:
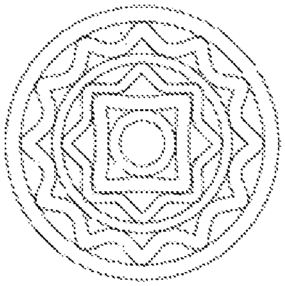
FIGS. 6 and 7 depict two embodiments of the lance of the present invention formed from six tubular profiles.
Figure 7:

FIGS. 6 and 7 show two embodiments of the present invention formed by six tubular concentric profiles and with multiple inner cavities.

Figure 8:
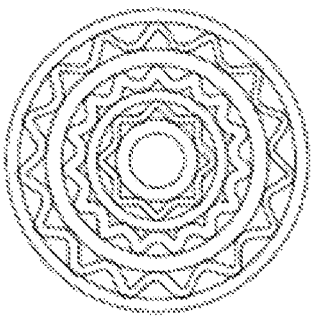
FIG. 8 depicts an embodiment of the lance of the present invention formed from seven tubular profiles.
Figure 9:
FIG. 9 depicts an embodiment of the lance of the present invention formed from eight tubular profiles.

FIGS. 8 and 9 show two embodiments of the present invention formed by seven and eight tubular concentric profiles and with multiple inner cavities, respectively.

Figure 10:
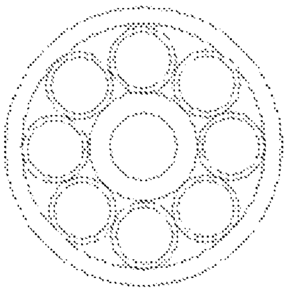
FIG. 10 depicts an embodiment of the lance of the present invention formed from ten tubular profiles.

FIG. 10 shows an embodiment of the present invention formed by ten tubular profiles with seventeen inner cavities.

Figure 11:
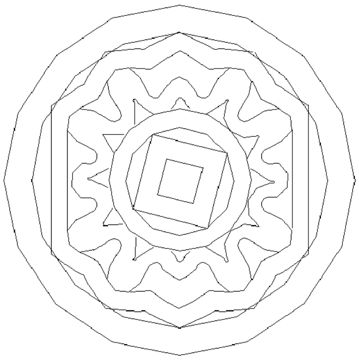
FIG. 11 depicts an embodiment of the lance of the present invention formed from five tubular profiles.

FIG. 11 shows another embodiment of the present invention formed by five tubular concentric profiles with multiple inner cavities, in which the inner cavities have uniform and non-uniform shapes in relation to one another.

It was surprisingly found that the variation of the amount of profiles forming a lance, together with the variation of the shapes of the profiles and to the sequential order of the profiles inside the lance, allow generating efficient cavities for the passage of the oxidizing gas stream, whereby making better use of the calorific value of the iron housed in the profiles; furthermore, the cross-sections of the profiles used in the conformation of the lance according to the present invention allow a design that obtains, at will, the required flexural strength, achieving, when required, greater strength than that which is obtained with lances of another type having the same mass. Additionally, the geometric configuration obtained in the lance as a whole allows concentrating the point of incidence of the lance with great precision, thereby achieving a more even, cleaner, more accurate and more efficient cutting.

As a result of the lances of the present invention making better use of the calorific value thereof, the lances of the present invention allow increasing their cutting speed and capacity, whereby reducing the time the operator is exposed to high temperatures, reducing the risk of thermal stress.

The lances of the present invention have varied uses, for example in the case of cutting copper and slag in sites such as: bears, pigs or settled accretions, furnace windows, furnace floors with brick and copper material, accretions in furnace walls, cleaning in the nozzle housing area, accretions in the gas outlet pre-chamber duct, passage opening, refining and anode furnaces.

The thermal lances can also be used for cutting that allows efficiently opening passages in, inter alia, copper, steel, ferroalloy, and platinum smelting furnaces, independently of the plugs having any composition, even if they consist of pure graphite (carbon). Likewise, they can be used for the fusion cutting and/or piercing of steels of any grade or thickness, for example 1,000 mm, 2,000 mm, 3,000 mm and thicker. They can also be used for the cutting and/or piercing concrete blocks or rocks and stones of any type and dimension.

Furthermore, as stated, the thermal lances of the present invention can be used for the fusion cutting and/or piercing of any type of material, even diamond, which is the most temperature-resistant material.

Some general application examples of the lances of the present invention are:

Rigid lances generating high heat energy and at the same time delivering a low or nil oxygen stream, for the cutting and/or piercing of non-ferrous materials in an efficient and precise manner.

Rigid lances generating low heat energy and at the same time delivering a high oxygen stream, for the cutting and/or piercing of ferrous materials in an efficient and precise manner.

Flexible lances generating high heat energy and at the same time delivering a low or nil oxygen stream, for the cutting and/or piercing of non-ferrous materials in sites with little space requiring the lance to bend.

Flexible lances generating low heat energy and at the same time delivering a high oxygen stream, for the cutting and/or piercing of ferrous materials in sites with little space requiring the lance to bend.

The invention claimed is:

1. A thermal lance for piercing and opening tapping passages in melting furnaces comprising:

a length, at least four tube, one arranged externally and at least three tubes arranged internally with at least two tubes having different profile cross-sections, at least seventeen internal cavities housed inside of said external tube and said external tube extending the length of said lance, wherein each tube extends fully through said length and said at least seventeen cavities include at least four shapes in cross section, and wherein each internal tube is selected from tubes having a circular, square, triangular, hexagonal, oval, or multipoint star-shaped cross-section and has a thickness in the range of 0.9 to 3.0 mm.

2. The thermal lance according to claim 1, wherein at least one end of said lance is coupleable configured for coupling to another article to extend the length of said lance.

3. The thermal lance according to claim 2, characterized in that the external tube forms the casing of the lance and said casing has a uniform outer structure.

4. The thermal lance according to claim 1, wherein the external tube and the internal tubes each have the same cross-section along the entire body thereof.

5. The thermal lance according to claim 1, characterized in that at least one of the external tube and the internal tubes has a plurality of cross-sectional profiles.

6. The thermal lance according to claim 4, characterized in that the thermal lance comprises at least thirty-seven internal cavities housed inside said lance.

7. The thermal lance according to claim 4, characterized in that the thermal lance comprises at least five tubes, one arranged externally and four arranged internally.

8. The thermal lance according to claim 7, characterized in that the thermal lance comprises at least forty-one internal cavities.

9. The thermal lance according to claim 1, wherein said internal cavities formed inside the lance have varied geometric shapes.

10. The thermal lance according to claim 1, wherein said internal cavities allow the free circulation of oxidized gases.

11. The thermal lance according to claim 4, characterized in that at least two internal tubes pairwise abut.

12. The thermal lance according to claim 4, characterized in that the internal tubes are located concentrically in relation to one another and in relation to the external tube.

13. The thermal lance according to claim 4, characterized in that the thermal lance comprises at least six tubes.

14. The thermal lance according to claim 3, wherein both ends of said lance are configured with a coupling device for coupling to another article and further comprises inverted conical ends (2) and an adjoining smooth and cylindrical surface, each of which has an annular external groove (3).

15. The thermal lance according to claim 14, characterized in that the outer shape of the thermal lance allows the easy assembly between one of said lances and another one of said lances through a hollow, outer coupling part or device that allows holding a lance at each of its ends, where the inverted conical end of each said lance allows facilitating a fitting with the coupling part, and the annular external groove (3) of said lance allows assuring the fitting between said lance and said coupling device.

16. The thermal lance according to claim 1, further comprising a ceramic coating withstandable to a temperature of 1,400° C.

17. A method for opening tapping passages in melting furnaces using a lance comprising the steps of:

heating a lance, delivering oxygen through said lance, aligning said lance with the location of a desired opening; and using said lance to pierce a passage;

wherein said lance is comprised of a length, at least four tubular profiles, one tube arranged externally and at least three tubes arranged internally to said external tube and with at least two tubes having different cross sections, and at least seventeen cavities housed inside of and extending the length of said lance, said at least four tubes comprising at least four shapes in cross section, wherein each internal tubular profile is selected from tubular profiles having a circular, square, triangular, hexagonal, oval, or multipoint star-shaped cross-section and has a thickness in the range of 0.9 to 3.0 mm.

18. The thermal lance of claim 1, wherein said external and internal tubes are not collectively commonly centered.

19. The thermal lance according to claim 4, characterized in that the thermal lance comprises at least seven tubes.

20. The thermal lance according to claim 4, characterized in that the thermal lance comprises at least eight tubes.

* * * * *